(12) United States Patent
Martin (10) Patent No.: US 11,056,998 B2
(45) Date of Patent: Jul. 6, 2021

(54) UNIVERSAL BONDING END CLAMP

(71) Applicant: Hubbell Incorporated, Shelton, CT (US)

(72) Inventor: Evan Ronald Martin, Merrimack, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 583 days.

(21) Appl. No.: 15/961,957

(22) Filed: Apr. 25, 2018

(65) Prior Publication Data

US 2018/0316307 A1    Nov. 1, 2018

Related U.S. Application Data

(60) Provisional application No. 62/492,322, filed on May 1, 2017.

(51) Int. Cl.
*H02S 40/34* (2014.01)
*F24S 25/636* (2018.01)
(Continued)

(52) U.S. Cl.
CPC ............. *H02S 40/34* (2014.12); *F16B 2/065* (2013.01); *F24S 25/636* (2018.05); *H01R 4/44* (2013.01); *F16B 2001/0064* (2013.01)

(58) Field of Classification Search
CPC .. F16B 2/065; F16B 2/12; F16B 7/048; F16B 7/0493; F16B 7/187; F16B 2001/0064;
(Continued)

(56) References Cited

U.S. PATENT DOCUMENTS 1,489,835 A    4/1924   Kietz
1,932,009 A    10/1933  Becker
(Continued)

FOREIGN PATENT DOCUMENTS

DE    202014009489 U1 * 12/2014  ............. F16B 7/187
EP    2592365 A2 *  5/2013  ............. F24S 25/636
(Continued)

OTHER PUBLICATIONS

International Preliminary Report on Patentability mailed in corresponding PCT/US18/29254 dated Nov. 14, 2019 (18 pages).
(Continued)

*Primary Examiner* — Josh Skroupa
(74) *Attorney, Agent, or Firm* — Wissing Miller LLP (57) ABSTRACT

Universal bonding end clamps used to assembly photovoltaic (PV) arrays and provide an electrically conductive path (or bond) between PV module frames forming part of the PV arrays and a rail system. The bonding clamp includes a clamp portion and a base portion. The clamp portion includes an electrically conductive body having a mounting structure, at least one electrical bonding member extending from the body, and at least one pressure member extending from the body and a base pressure member extending from the body. The clamp portion may also include one or more spacers to facilitate the alignment of the clamp portion relative to the base portion. The base portion includes an upper wall having a mounting structure, a lower wall having a mounting structure and a side wall between the upper and lower walls. When the clamp portion is positioned relative to base portion for installation, the clamp portion mounting structure is aligned with the base portion mounting structures, and the base pressure member engages the side wall.

35 Claims, 11 Drawing Sheets

(51) Int. Cl.
*H01R 4/44* (2006.01)
*F16B 2/06* (2006.01)
*F16B 1/00* (2006.01)

(58) Field of Classification Search
CPC ... F24S 25/636; H01R 4/2429; H01R 4/2433; H01R 4/42; H01R 4/44; H02S 30/00; H02S 40/34; Y10T 403/7067; Y10T 403/7194
USPC .............. 403/374.3, 400; 439/431–433, 444
See application file for complete search history.

(56) References Cited

U.S. PATENT DOCUMENTS

| | | |
|---|---|---|
| 3,425,028 A | 1/1969 | Neaderland |
| 3,509,517 A | 4/1970 | Gutshall |
| 4,496,791 A | 1/1985 | Reichert |
| 4,825,513 A | 5/1989 | Verespej |
| 4,968,268 A | 11/1990 | Oh |
| 8,353,650 B2 | 1/2013 | Wiley et al. |
| 8,505,864 B1 | 8/2013 | Taylor |
| 8,925,263 B2 * | 1/2015 | Haddock ................. F16B 2/065 52/173.3 |
| 9,051,950 B2 * | 6/2015 | Jaffari ..................... F16B 2/065 |
| 9,097,443 B2 * | 8/2015 | Liu ........................ F24S 25/636 |
| 9,689,411 B2 | 6/2017 | Meine |
| 9,803,893 B2 * | 10/2017 | Giraudo ................. F16B 2/065 |
| 9,876,463 B2 * | 1/2018 | Jasmin ................... F24S 25/636 |
| 2012/0244729 A1 | 9/2012 | Rivera et al. |
| 2014/0010616 A1 | 1/2014 | Meine et al. |
| 2015/0101655 A1 | 4/2015 | Schuit et al. |

FOREIGN PATENT DOCUMENTS

| | | |
|---|---|---|
| FR | 2456401 | 12/1980 |
| WO | 2016205817 | 12/2016 |
| WO | WO-2017100574 A1 * | 6/2017 ............ F24S 25/636 |

OTHER PUBLICATIONS

International Search Report and Written Opinion mailed in corresponding PCT/US18/29254 dated Jul. 19, 2018 (11 pages).

* cited by examiner

FIG. 24

UNIVERSAL BONDING END CLAMP

CROSS REFERENCE TO RELATED APPLICATIONS

The present application is based on and claims benefit from U.S. Provisional Application Ser. No. 62/492,322 filed May 1, 2017 entitled "Universal Bonding End Clamp" the entire contents of which are incorporated herein in its entirety by reference.

BACKGROUND

Field

The present disclosure relates generally to bonding clamps, and more particularly to universal bonding end clamps used to secure photovoltaic module frames to a rail system while providing an electrical bond between the frames and rail system.

Description of the Related Art

Photovoltaic arrays are typically composed of a number of photovoltaic modules set within a metallic frame, and a rail system that supports the photovoltaic modules. When installing a photovoltaic array, a number of photovoltaic modules are assembled onto the rail system, which is sometimes called rails or racking structures. The metallic frames of the individual photovoltaic modules, and the structural pieces, e.g., the rails, on which the modules mount are generally made out of aluminum, which is typically anodized to resist corrosion. Although the frames of the photovoltaic modules are directly bolted or clamped to the rails, the anodizing insulates the metal structures so that they are not electrically bonded unless measures are taken to electrically bond them.

Like other sources of electrical power, to ensure safety, the metal frames of the photovoltaic modules and the metal rails on which they are secured are often required by national or local electrical codes to be electrically bonded. Electrical bond and/or electrically bonded are used in the technical sense to mean forming an electrically conductive path between the metal structures to ensure electrical continuity between the metal structures sufficient to safely conduct any electrical current imposed on the metal structures.

To electrically bond the metal structures, a common practice in the industry is to install a separate grounding lug on each piece that is anodized, or a separate grounding washer between anodized metal structures. A grounding lug is attached to the sheet metal frame of the photovoltaic modules with a thread forming stainless steel screw. Since the screw cuts into the aluminum it forms a connection which can maintain an electrical bond over time. However, a common sheet metal thickness is fairly thin, e.g., 0.050 inch, and a common screw size is 10-32 so that the screw therefore only makes connection on about 2½ threads, which provides a marginally acceptable surface contact area in terms of mechanical strength and electrical conductivity. Using separate bonding washers between metal structures provides a larger electrical contact area for an improved electrical bonding connection. However, adding grounding lugs or separate bonding washers increases the cost to install photovoltaic arrays, in terms of supplies and in terms of labor costs.

SUMMARY

The present disclosure provides descriptions of embodiments for universal bonding end clamps used to assemble photovoltaic (PV) arrays and provide an electrically conductive path (or bond) between PV module frames forming part of the PV arrays and a rail system. In one exemplary embodiment, the bonding clamp includes a clamp portion and a base portion. The clamp portion includes a body having a top surface, a bottom surface, and a mounting structure for receiving a mounting fastener, at least one electrical bonding member extending from the body, at least one pressure member extending from the body, and a base pressure member extending from the body. The base portion includes an upper wall having a first mounting structure, a lower wall having a second mounting structure, the second mounting structure being aligned with the first mounting structure, and a side wall between the upper wall and the lower wall. When the clamp portion is positioned relative to base portion for installation, the clamp portion mounting structure is aligned with the first and second mounting structures and the base pressure member engages the side wall.

In another exemplary embodiment, the bonding clamp includes a clamp portion and a base portion. The clamp portion includes an electrically conductive body, at least one electrical bonding member, at least one pressure member, a base pressure member and first and second spacer members. The body has a top surface, a bottom surface, first and second spacer sides, a frame side, a base side and a mounting structure for receiving a mounting fastener. The at least one electrical bonding member and the at least one pressure member extend from the frame side of the electrically conductive body. The base pressure member extends from the base side of the electrically conductive body. The first spacer member extends from the first spacer side of the electrically conductive body, and the second spacer member extends from the second spacer side of the electrically conductive body. The base portion includes an upper wall having a first mounting structure, a lower wall having a second mounting structure, the second mounting structure being aligned with the first mounting structure, and a side wall between the upper wall and the lower wall. When the clamp portion is positioned relative to base portion for installation, the clamp portion mounting structure is aligned with the first and second mounting structures and the base pressure member engages the side wall.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides descriptions of embodiments for universal bonding end clamps used to assemble photovoltaic (PV) arrays having module frames of varying heights. The universal bonding end clamp also provides an electrically conductive path between the PV module frames forming part of a PV array and a rail system forming part of the PV array to facilitate bonding the PV array. For ease of description in the present disclosure, the universal bonding end clamp may also be referred to herein as the bonding clamp. It should also be noted that this specification and the accompanying drawings are to be regarded in an illustrative sense rather than a restrictive sense. Various modifications may be made thereto without departing from the spirit and scope of the present disclosure.

Figure 1:
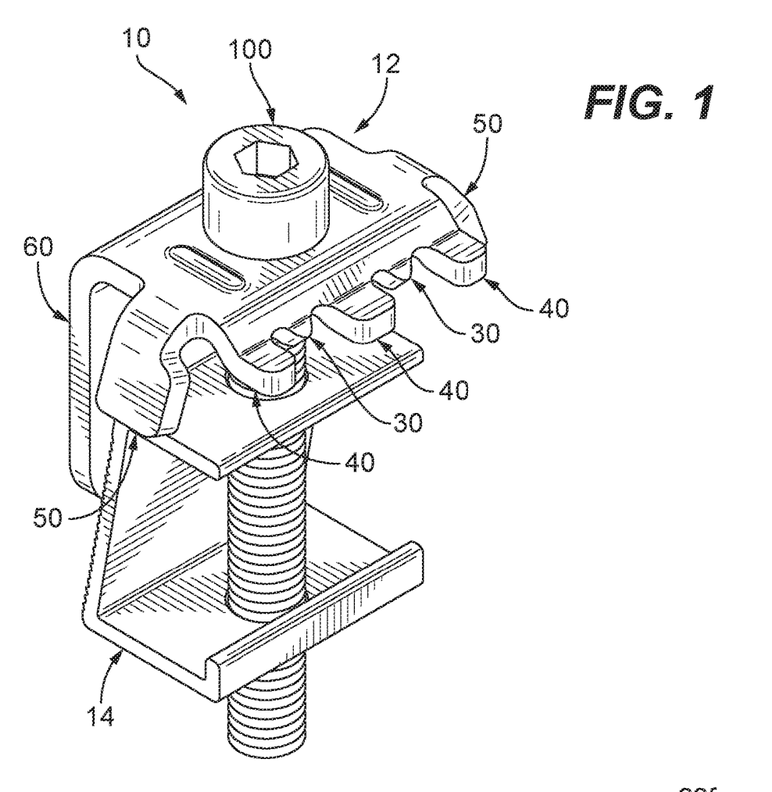
FIG. 1 is a top front perspective view of an exemplary embodiment of a universal bonding end clamp according to the present disclosure.

Referring to FIG. 1, an exemplary embodiment of a bonding clamp according to the present disclosure is shown. The bonding clamp according to this exemplary embodiment is for use as a bonding clamp for a single PV module frame, such as at an end of row in a PV array. Such bonding clamps may also be called end clamps. In this exemplary embodiment, the bonding clamp 10 includes a clamp portion 12 and a base portion 14. The clamp portion 12 includes a body 20, at least one electrical bonding member 30, at least one pressure member 40, at least one spacer member 50 and a base pressure member 60.

Figure 2:
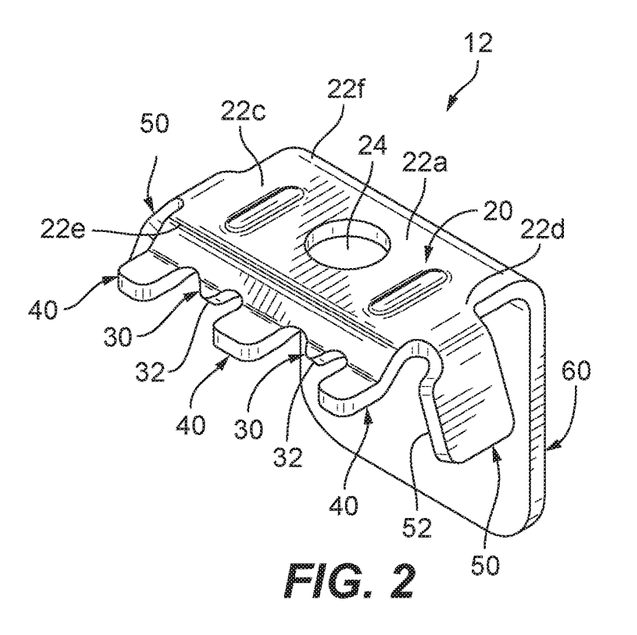
FIG. 2 is a top front perspective view of an exemplary embodiment of a clamp portion of the universal bonding end clamp according to the present disclosure.
Figure 3:
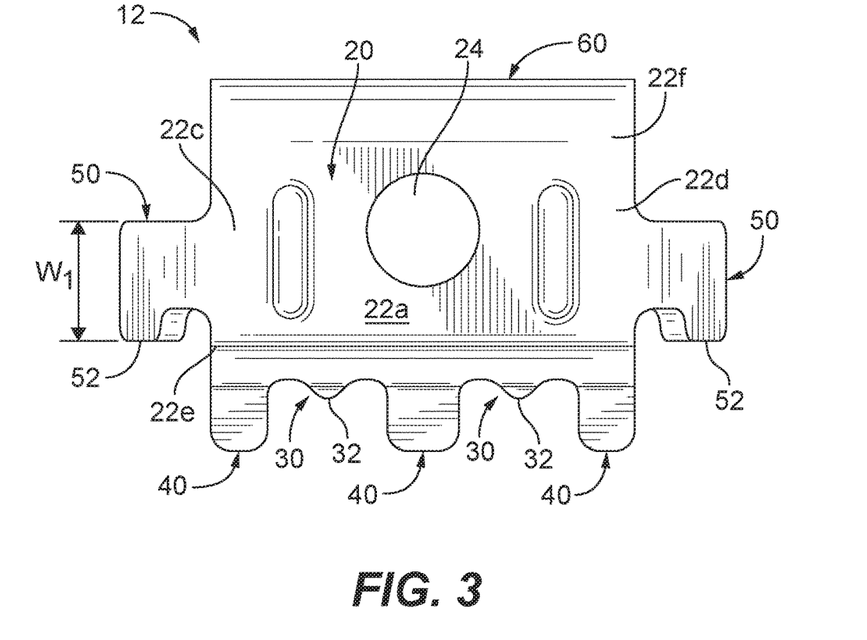
FIG. 3 is a top plan view of the clamp portion of FIG. 2.

Referring to FIGS. 2-7, the body 20 has a top surface 22a, a bottom surface 22b (seen in FIGS. 4 and 4A), a pair of spacer ends 22c and 22d, a frame side 22e and a base side 22f. Extending from the frame side 22e of the body 20 are the electrical bonding members 30 and the pressure members 40. Extending from the spacer ends of the body 20 are the spacer members 50. Extending from the base side 22f of the body 20 is the base pressure member 60. The base pressure member 60 may be perpendicular to the body 20 or it may be at an angle relative to the body 20. A mounting structure, which in this exemplary embodiment is an aperture 24, seen in FIGS. 2 and 3, is provided in a center region of the body 20 and is configured to receive a mounting fastener 100, such as a nut and bolt fastener, seen in FIG. 1. The body 20 is made of a material that provides sufficient structural integrity to secure PV module frames 200 to a rail 300 of a rail system as shown in FIGS. 19, and 21-24, while also capable of conducting electricity to provide an electrical bond. As examples, the body 20 can be made of stainless steel or other conductive steel, aluminum and/or aluminum alloy. It should also be noted that the mounting fastener 100 is made of a material that is capable of conducting electricity to provide an electrical bond. As examples, the mounting fastener 100 can be made of stainless steel or other conductive steel, aluminum and/or aluminum alloy.

Continuing to refer to FIGS. 2-7, the at least one electrical bonding member 30 includes in this embodiment a plurality of electrical bonding members, e.g., two electrical bonding members, extending from frame side 22e of the body 20. Each electrical bonding member 30 may have one or more piercing surfaces 32 for cutting through or piercing non-conductive coatings, e.g., oxide, paint and/or anodization, on a PV module frame. The piercing surfaces 32 may be in the form of, for example, a pointed tip or a serrated tip. However, one skilled in the art would readily appreciate that the piercing surfaces 32 may come in many forms, shapes and/or structures sufficient to cut through or pierce non-conductive coatings. In the embodiment of FIGS. 2-6, each electrical bonding member 30 has a single piercing surface 32, e.g., a pointed tip, for cutting through or piercing non-conductive coatings on PV module frames. In another embodiment, seen in FIG. 7, each electrical bonding member 30 may have a plurality of piercing surfaces, such as a "V-shaped" type tip structure that provides two piercing surfaces 32.

Figure 4:
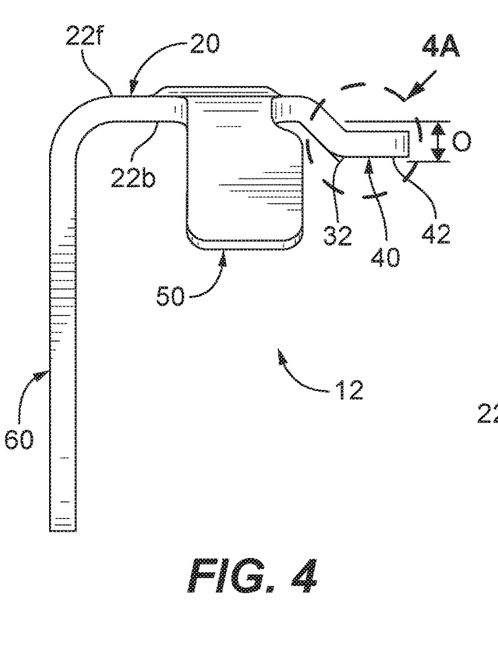
FIG. 4 is a side elevation view of the clamp portion of FIG. 2.
Figure 4A:
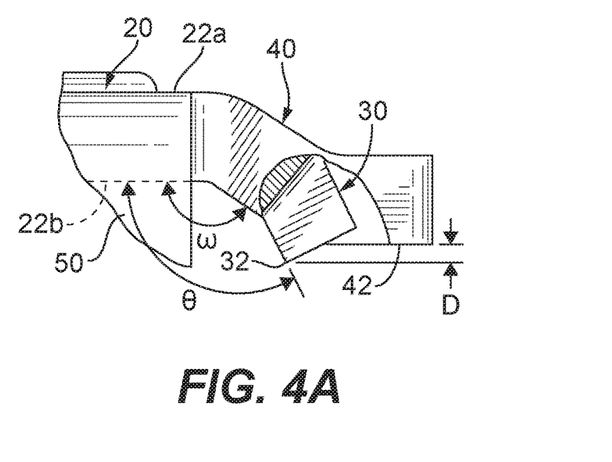
FIG. 4A is an enlarged view of a portion of the clamp portion of FIG. 4 taken from detail 4A.
Figure 19:
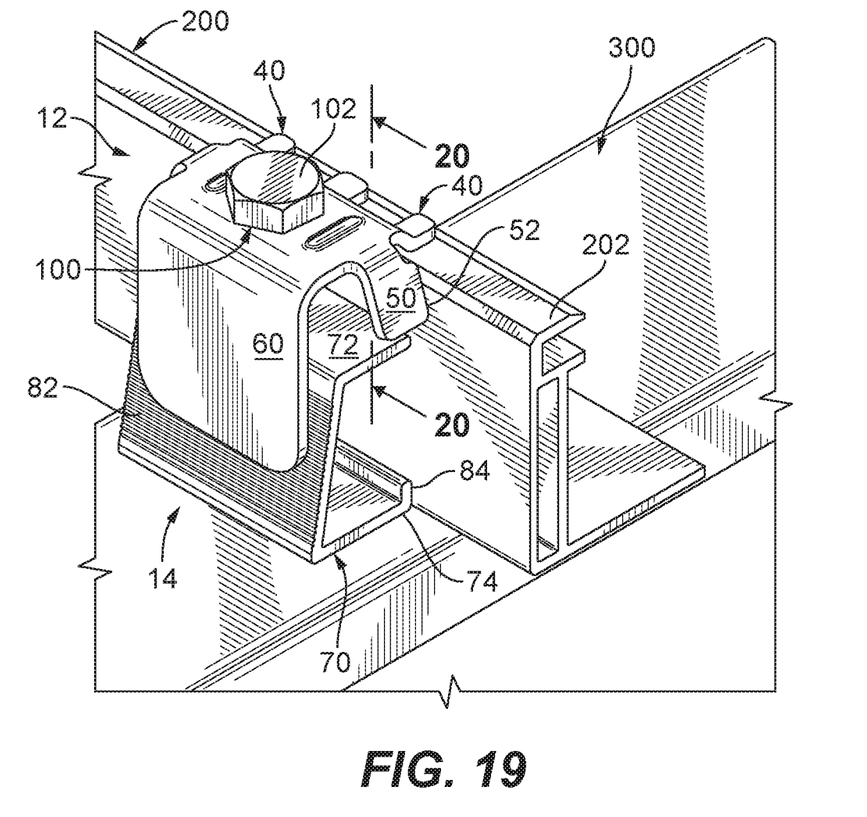
FIG. 19 is a top rear perspective view of a portion of a photovoltaic array with the universal bonding end clamp of FIG. 1 connecting and bonding a photovoltaic module frame to a rail.
Figure 20:
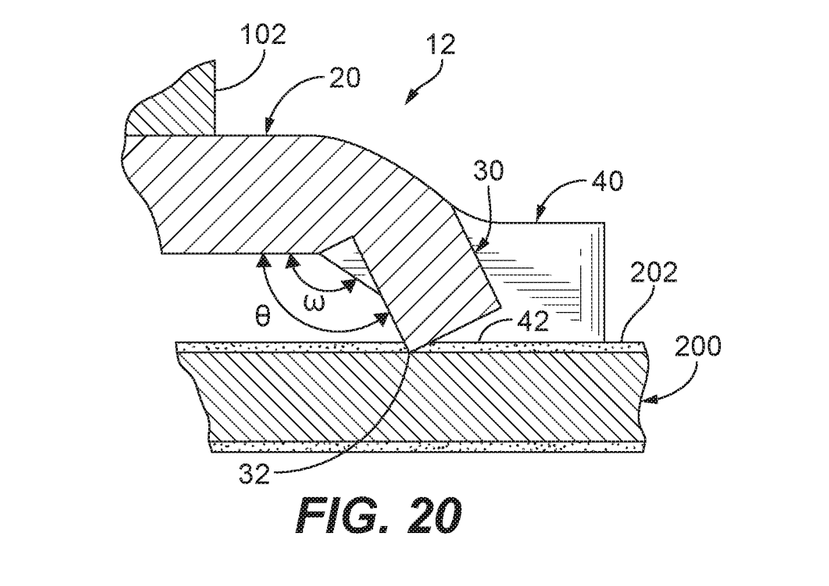
FIG. 20 is a partial cross-sectional view of the photovoltaic array with the universal bonding end clamp in FIG. 19 taken along line 20-20.
Figure 21:
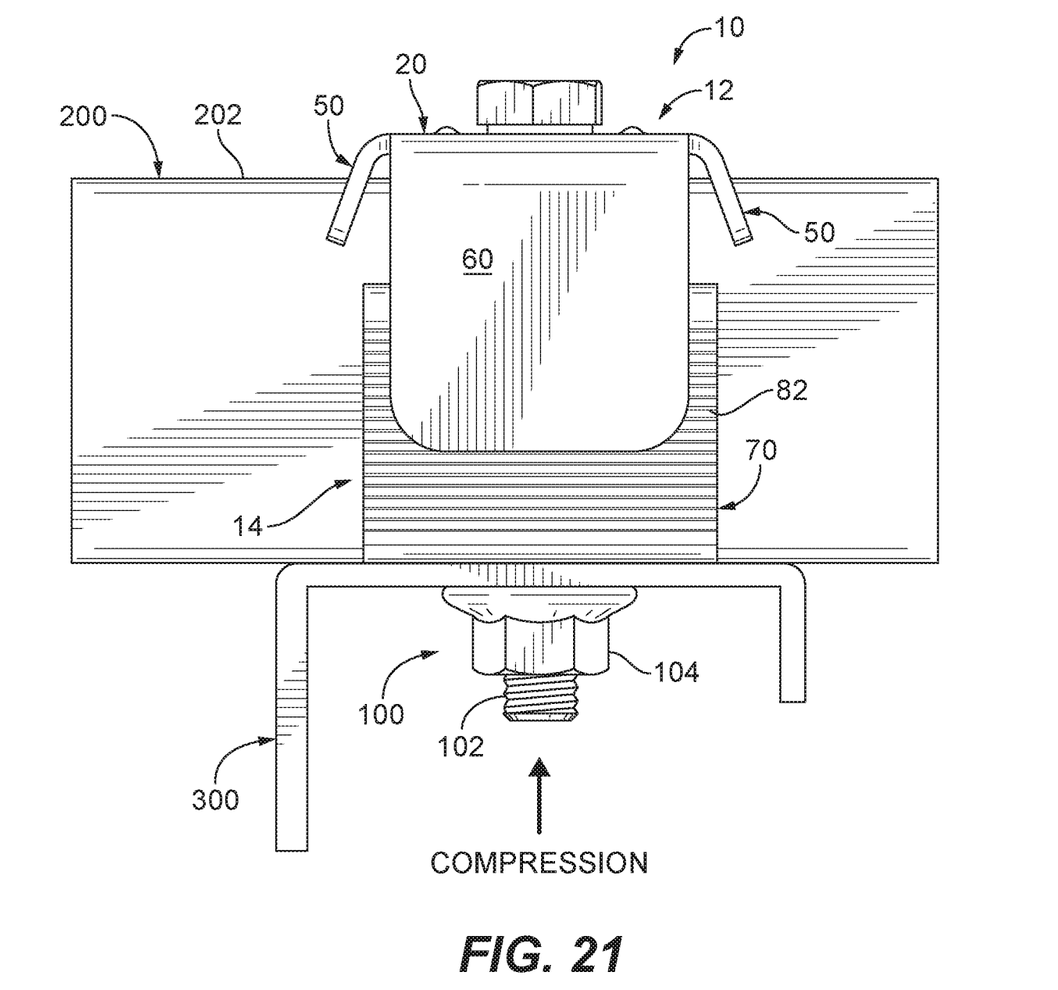
FIG. 21 is a rear elevation view of the photovoltaic array of FIG. 19, illustrating the universal bonding end clamp of FIG. 1 connecting and bonding the photovoltaic module frame to the rail using a nut and bolt fastener.

Referring to FIGS. 4 and 4A, the electrical bonding members 30 extend from the body 20 at an angle "θ" relative to the bottom surface 22b of the body 20. The angle θ of the electrical bonding members 30 should be sufficient so that the piercing surface or surfaces 32 of the electrical bonding members 30 can engage the PV module frame 200 as shown in FIGS. 19-21 when installed in a PV array, as seen in FIG. 20, and pierce through any non-conductive surface on the PV module frame 200. In one exemplary embodiment, the angle "θ" of the electrical bonding members 30 may be in for example the range from about 30 degrees to about 90 degrees, but those skilled in the art would readily appreciate that other angles may be used. The electrical bonding members 30 can be integrally formed with the body 20 or the electrical bonding members 30 can be joined to the body 20 by for example a welded joint. The electrical bonding members 30 are made of a material that provides sufficient structural integrity to pierce non-conductive coatings on PV module frames 200 while also being capable of conducting electricity to provide an electrical bond. As examples, the electrical bonding members 30 can be made of stainless steel or other conductive steel, aluminum and/or aluminum alloy.

Referring again to FIGS. 2-6, the at least one pressure member 40 includes, in this embodiment, a plurality of pressure members 40, e.g., three pressure members, extending from the frame side 22e of the body 20. The at least one pressure members 40 may be a single pressure member 40 extending from a central portion of the frame side 22e of the body 20 and the one or more electrical bonding members 30 may be positioned on each side of the single pressure member 40.

The pressure members 40 are provided to engage PV module frames 200 and apply a force or pressure to the PV module frames 200 in the direction of a rail 300 of a rail system as shown in FIGS. 19 and 21-24 so as to secure the PV module frames 200 to a rail 300 of a rail system. Each pressure member 40 may have a substantially flat frame engaging surface 42 to ensure an even and uniform engagement between the pressure member 40 and a PV module frame 200, seen in FIGS. 4 and 4A. Each pressure member 40 may be offset from the body 20 relative to the bottom surface 22b of the body, as shown in FIGS. 4 and 4A, such that the frame engaging surface 42 of the pressure member 40 lies in a different plane than the bottom surface 22b of the body 20. That is, the frame engaging surface 42 of the pressure member 40 is spaced a distance "O" from the bottom surface 22b of the body 20. As an example, the distance "O" may be in for example the range from about 1 mm to about 20 mm. However, one skilled in the art would readily appreciate that the distance "O" may be any distance suitable to exert a force on the bonding clamp 10 as described herein. In such an embodiment, when securing the bonding clamp 10 to a rail system, this offset exerts a force on the bonding clamp 10 that opposes the compression (or clamping) force, seen in FIGS. 21 and 22, of a fastener used to secure the bonding clamp 10 and PV module frame 200 to a rail 300 of a rail system so as to maintain a tight connection of the bonding clamp 10 to the PV module frame 200. The angle "ω" of the offset, seen in FIG. 4A, should be sufficient so that the frame engaging surface 42 of the pressure members 40 can engage a PV module frame 200 when installed in a PV array. In one exemplary embodiment, the angle "ω" of the pressure members 40 may be in for example the range from about 30 degrees to about 90 degrees, but those skilled in the art would readily appreciate that other angles may be used.

The pressure members 40 can be integrally formed with the body 20 or the pressure members 40 can be joined to the body by for example a welded joint. The pressure members 40 can be made of a material that provides sufficient structural integrity to apply pressure or a force on PV module frames 200. The pressure members 40 can also be made of a material capable of conducting electricity. As examples, the pressure members 40 can be made of stainless steel or other conductive steel, aluminum and/or aluminum alloy. However, one skilled in the art would readily recognize that the pressure members 40 can be made of other electrically conductive and non-conductive materials.

Turning again to FIGS. 4 and 4A, in order for the piercing surface 32 of the electrical bonding member 30 to pierce non-conductive surfaces of PV module frames, the piercing surface 32 should extend beyond the frame engaging surfaces 42 of the pressure members 40 a distance "D" that may be in for example the range from about 0.01 mm to about 1.5 mm. In this exemplary embodiment, the frame engaging surfaces 42 of the pressure members 40 can also be used as a stop to limit the depth at which the piercing surface 32 of the electrical bonding member 30 penetrates the non-conductive coating and the conductive metal of the PV module frame 200.

Referring again to FIGS. 2-5, extending from the spacer ends 22c and 22d of the body 20 are spacer members 50, e.g., spacer arms. The spacer members 50 include an offset 52 used to engage a PV module frame 200. The spacer members 50 facilitate a substantially uniform alignment between the clamp portion 12, the base portion 14 and the PV modules frame 200 when the bonding clamp 10 is secured to a rail 300 of a rail system. The spacer members 50 also ensure that the bonding clamp 10 does not rotate when being secured to the rail 300 of a rail system so that the electrical bonding members 30 remain engaged with the PV module frame 200. In one exemplary embodiment, the spacer members 50 extend outward from the body 20, and have a bend which is in substantially the same direction as the electrical bonding members 30 extending from the body 20. The bend in the spacer members 50 should be sufficient so that the offset 52 on the spacer members 50 can engage the PV module frame 200 when installed. In one exemplary embodiment, seen in FIG. 5, the bend angle "a" of the spacer members 50 may be in the range of between about 30 degrees and about 90 degrees, but other bend angles may be used. The spacer members 50 can be integrally formed to the body 20, or the spacer members 50 can be secured to the body 20 by for example a welded joint. In another embodiment the spacer members 50 may extend from the bottom surface 22b of the body 20 and substantially perpendicular to the bottom surface 22b of the body 20. In another embodiment, a single spacer 50 may be used that extends from the bottom surface 22b along a portion of the length of the body 20 or along the length of the body 20. The spacer members 50 have a width "$W_1$", seen in FIG. 3, which can be in the range from about 0.25 inches to about 1.5 inches. However, one skilled in the art would readily appreciate that the width "$W_1$" can be any width that permits the offset 52 in the spacer members 50 to engage the PV module frame 200 when the bonding clamp 10 is installed. The spacer members 50 can be made of a material that provides sufficient structural integrity to maintain the alignment between the clamp portion 12 and the base portion 14, and to withstand any torque applied to the bonding clamp 10 when tightening a mounting fastener 100. The spacer members 50 can also be made of a material capable of conducting electricity. As examples, the spacer members 50 can be made of stainless steel or other conductive steel, aluminum and/or aluminum alloy. However, one skilled in the art would readily recognize that the spacer members 50 can be made of other electrically conductive materials and non-conductive materials.

Figure 5:
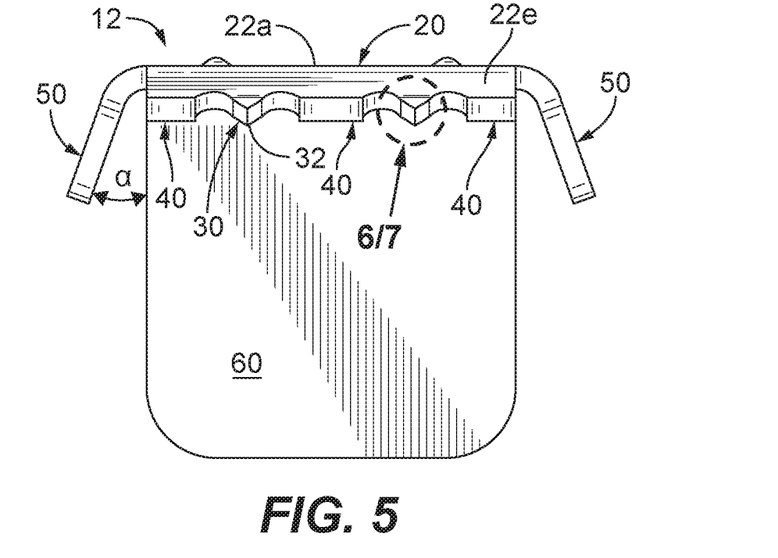
FIG. 5 is a front elevation view of the clamp portion of FIG. 2.
Figure 6:
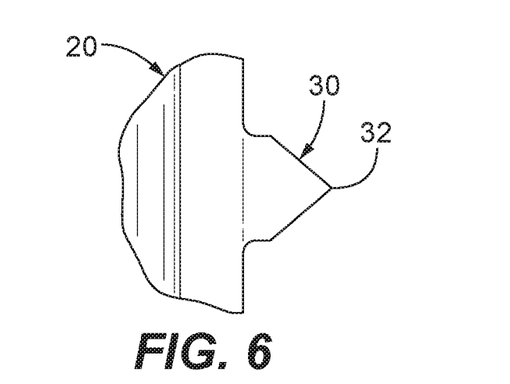
FIG. 6 is an enlarged view of a portion of the clamp portion of FIG. 5 taken from detail 6/7, and illustrating an exemplary embodiment of an electrical bonding member according to the present disclosure.
Figure 7:
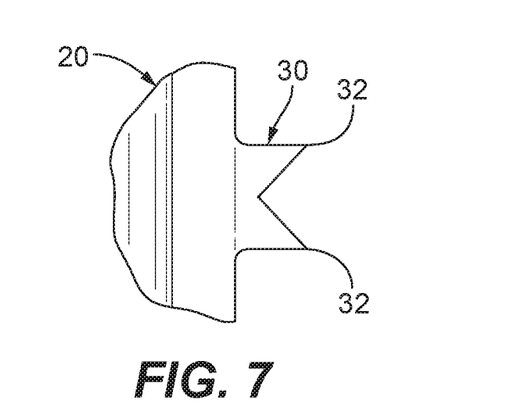
FIG. 7 is an enlarged view of a portion of the clamp portion of FIG. 5 taken from detail 6/7, and illustrating another exemplary embodiment of an electrical bonding member according to the present disclosure.

Referring to FIGS. 2, 4 and 5, the base pressure member 60 will be described. As noted, the base pressure member 60 has one end extending from the base side 22f of the body 20 and the other end is a free end. In this exemplary embodiment, the base pressure member 60 is a rigid plate like structure that is capable of exerting a force against the base portion 14 when securing the bonding clamp 10 to a PV module frame 200 and rail 300 of a rail system as described below. The base pressure member 60 can be integrally formed with the body 20 or the base pressure member 60 can be joined to the body 20 by for example a welded joint. The base pressure member 60 is made of a material that provides sufficient structural integrity to apply pressure or a force on the base portion 14 in order to secure the bonding clamp 10 and the PV module frame 200 to a rail 300, and to withstand torque applied to the bonding clamp 10 when secured to a PV module frame 200 and rail 300, as described below. The base pressure member 60 can also be made of a material capable of conducting electricity. As examples, the base pressure member 60 can be made of stainless steel or other conductive steel, aluminum and/or aluminum alloy. However, one skilled in the art would readily recognize that the base pressure member 60 can be made of other electrically conductive materials and non-conductive materials.

Figure 8:
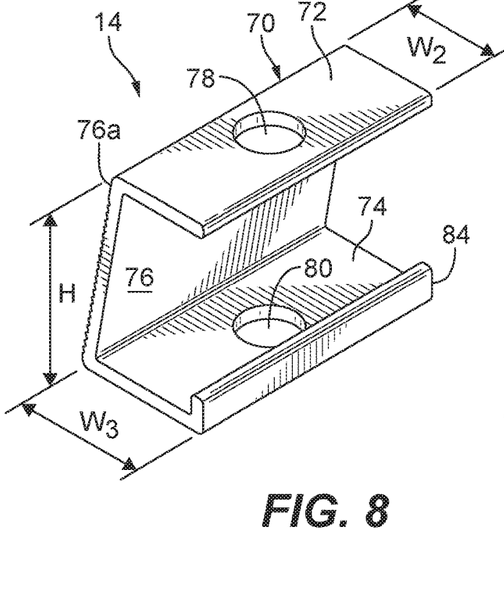
FIG. 8 is a top front perspective view of an exemplary embodiment of a base portion of the universal bonding end clamp of the present disclosure.
Figure 9:
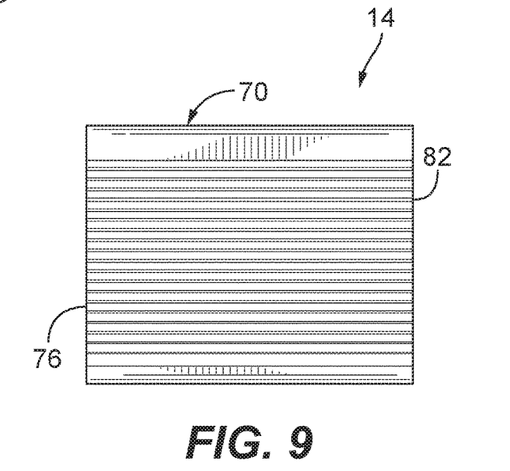
FIG. 9 is a rear elevation view of the base portion of FIG. 8.
Figure 10:
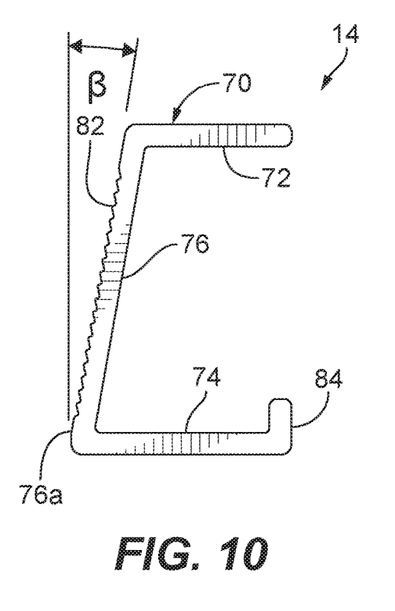
FIG. 10 is a side elevation view of the base portion of FIG. 8.
Figure 11:
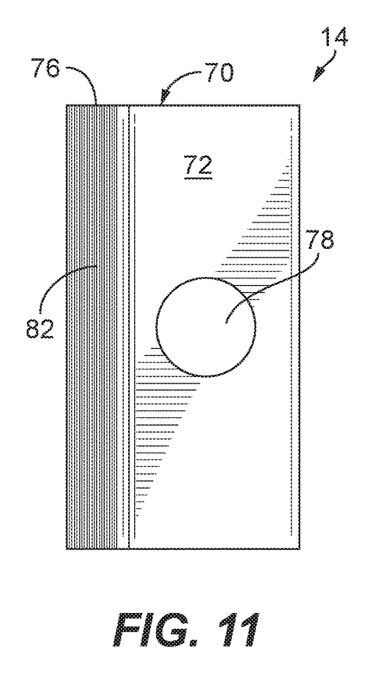
FIG. 11 is a top plan view of the base portion of FIG. 8.
Figure 12:
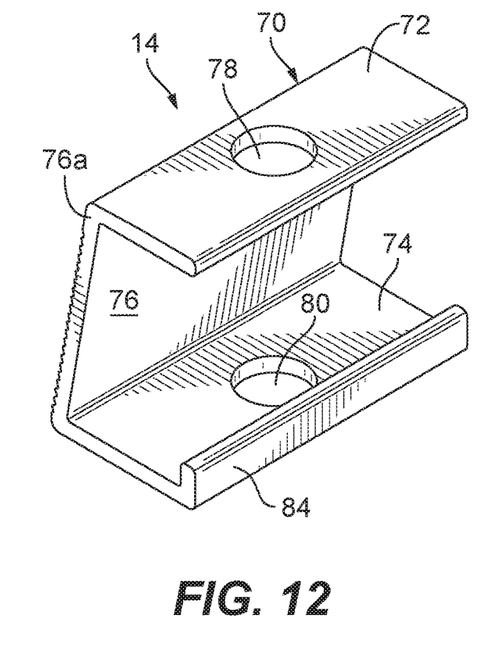
FIG. 12 is a top front perspective view of another exemplary embodiment of a base portion of the universal bonding end clamp of the present disclosure.
Figure 13:
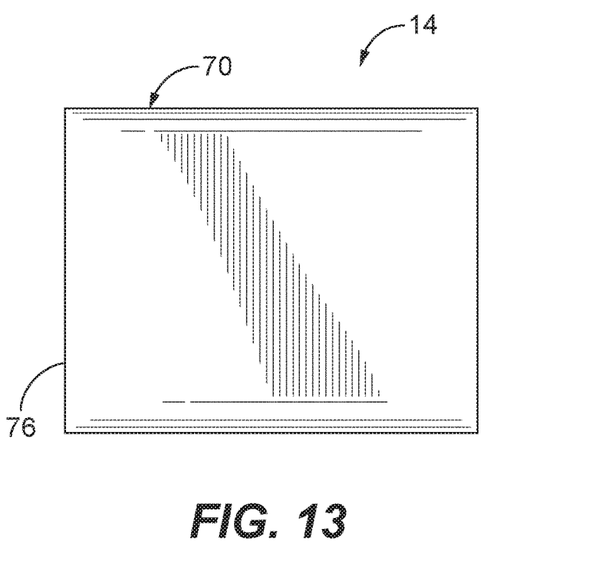
FIG. 13 is a rear elevation view of the base portion of FIG. 12.
Figure 14:
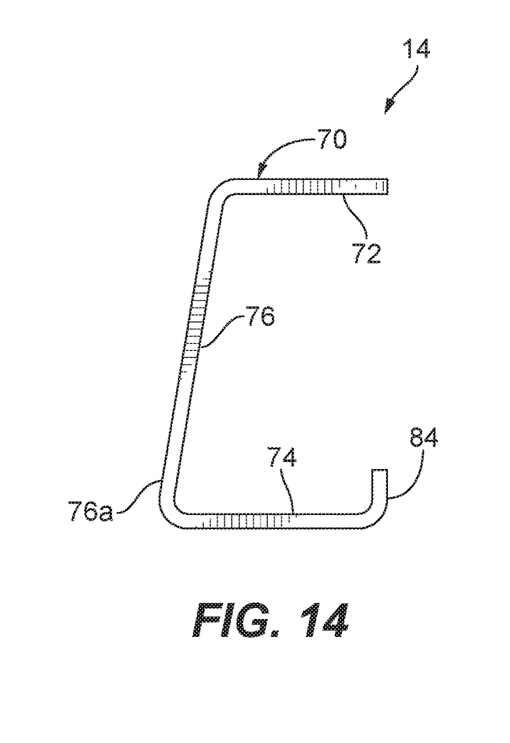
FIG. 14 is a side elevation view of the base portion of FIG. 12.
Figure 15:
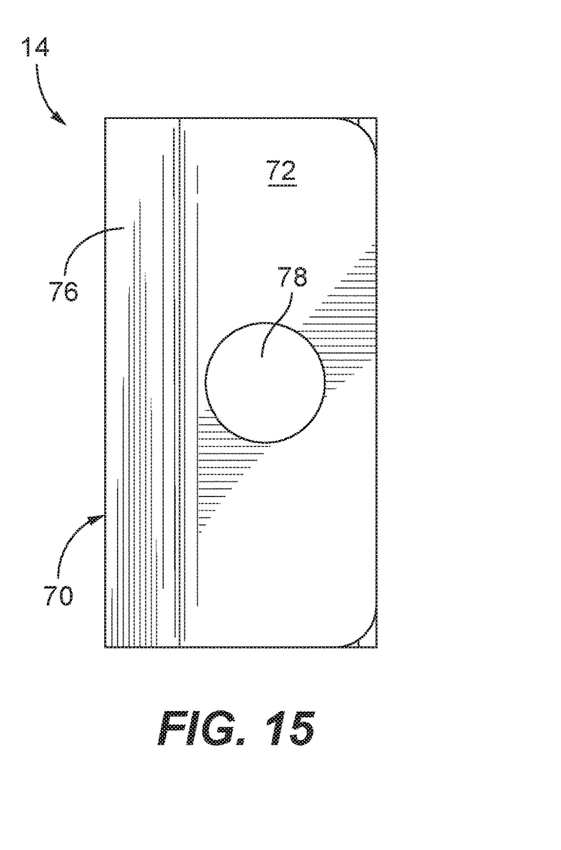
FIG. 15 is a top plan view of the base portion of FIG. 12.
Figure 16:
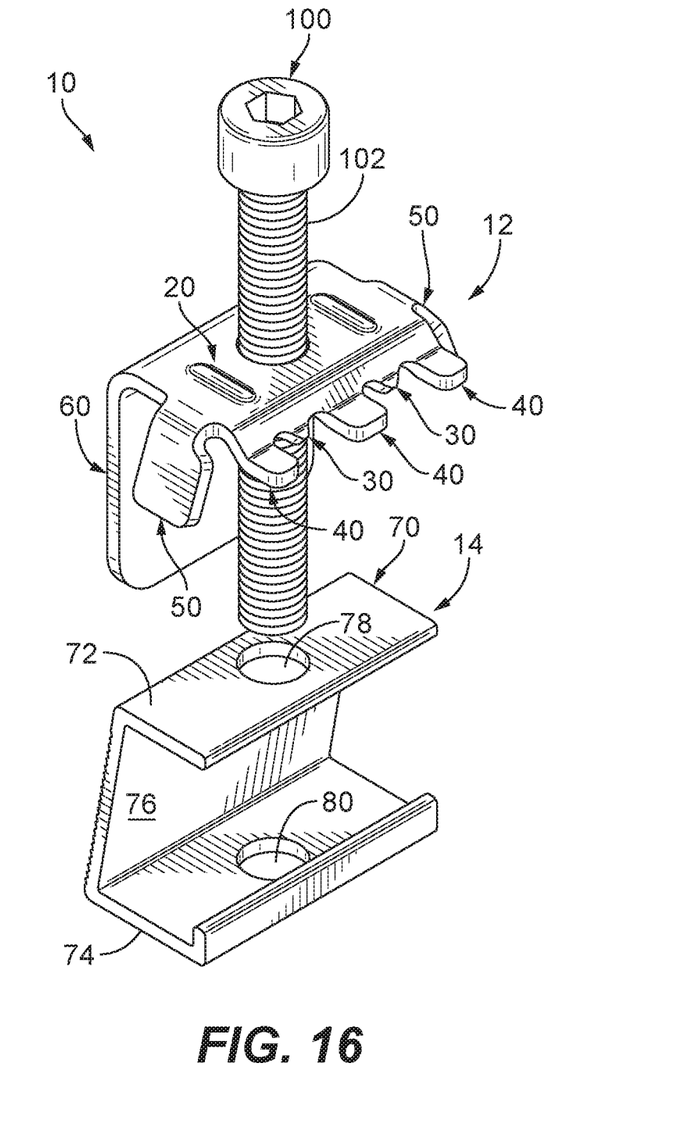
FIG. 16 is a top front perspective view with parts separated of the universal bonding end clamp of FIG. 1.
Figure 17:
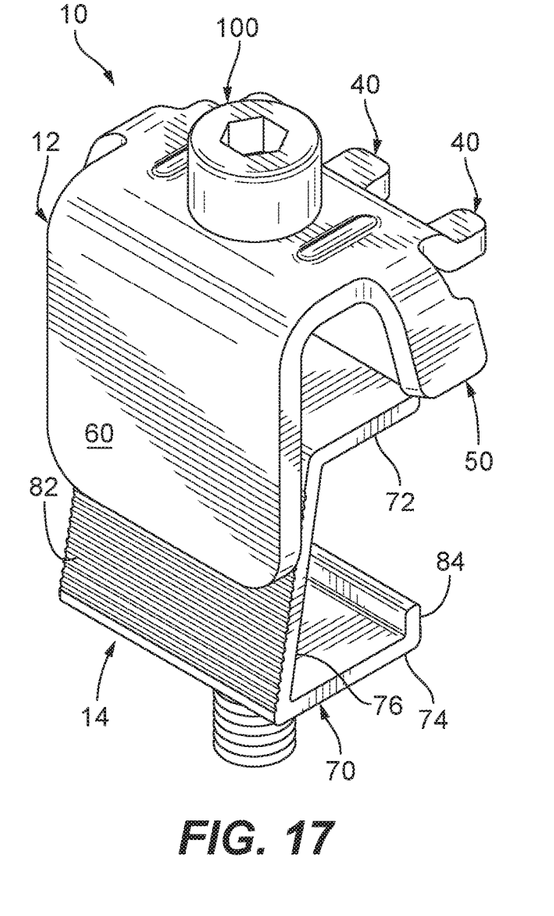
FIG. 17 is a top rear perspective view of the universal bonding end clamp of FIG. 1.
Figure 18:
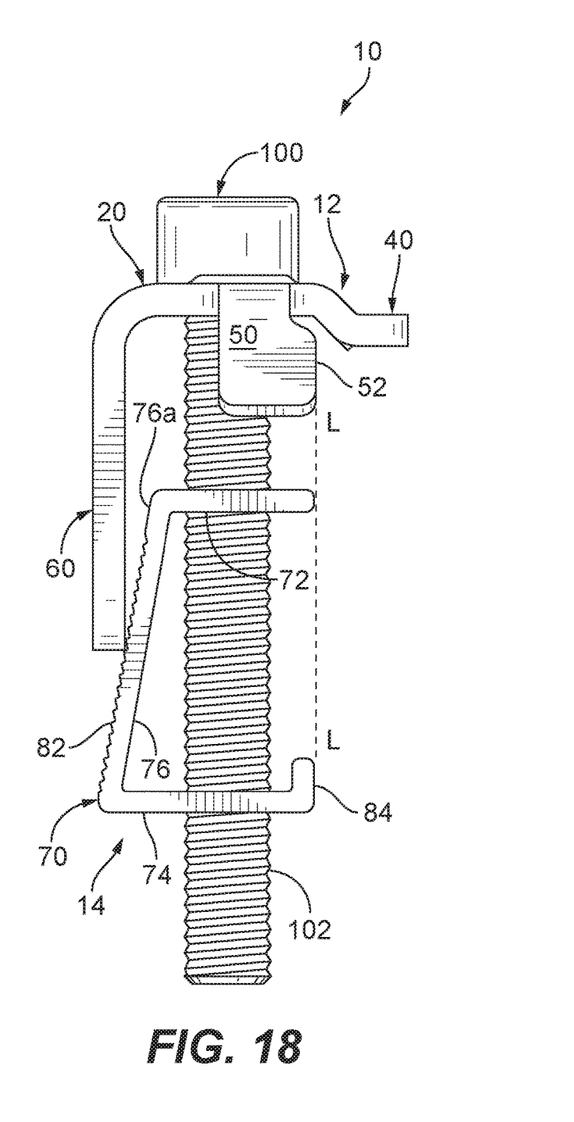
FIG. 18 is a side elevation view of the universal bonding end clamp of FIG. 1.

Turning to FIGS. 8-11, an exemplary embodiment of the base portion 14 of the bonding clamp 10 is shown. In this exemplary embodiment, the base portion 14 includes a body 70 having an upper wall 72, a lower wall 74 and a side wall 76 connecting the upper wall 72 to the lower wall 74. In the embodiment shown, the side wall 76 is connected to a long side of the upper wall 72 and a long side of the lower wall 74. A frame stop 84 may be integrally formed into or secured to the lower wall 74, as shown in FIGS. 8 and 10. A frame stop similar to frame stop 84 may be integrally formed into or secured to the upper wall 72 as well. The frame stop 84 engages a PV module frame 200 when the bonding clamp 10 when installed. The upper wall 72 has a width "$W_2$" and the lower wall 74 has a width "$W_3$." In some embodiments, the width of the upper wall 72 may be less than the width of the lower wall 74. In other embodiments, the width of the upper wall 72 may be greater than or equal to the width of the lower wall 74. The upper wall 72 includes a mounting aperture 78 and the lower wall 74 include a mounting aperture 80 that is aligned with the mounting aperture 78 in the upper wall 72. As such, a mounting fastener 100 can be passed through the mounting aperture 78 in the upper wall 72 and through the mounting aperture 80 in the lower wall.

In instances where the width "$W_2$" of the upper wall 72 is less than the width of "$W_3$" of the lower wall 74, to ensure the mounting apertures 78 and 80 are aligned. The side wall 76 has an angle "β" relative to perpendicular, as seen in FIGS. 8 and 10. The side wall 76 is engaged by the base pressure member 60 of the clamp portion 12, as will be described below. In one exemplary embodiment, an outer surface 76a of the side wall 76 may include one or more ribs 82 that facilitate increased gripping between the base pressure member 60, as shown in FIG. 5, and the side wall 76. In another exemplary embodiment shown in FIGS. 12-15, the outer surface 76a of the side wall 76 may be a substantially flat surface that is engaged by the base pressure member 60.

Referring to FIGS. 1 and 16-18, to align clamp portion 12 to the base portion 14, the clamp portion is positioned over the base portion 14 so that the mounting aperture 24 in the clamp portion 12 is aligned with the mounting apertures 78 and 80 in the base portion 14 and so that the base pressure member 60 is adjacent the side wall 76 of the base portion 14 as shown. With the mounting apertures 78 and 80 aligned, a bolt 102 can be passed through the clamp portion 12 and the base portion 14 thus aligning the vertical orientation of the clamp portion 12 with the base portion 14 so that an outer edge of the frame stop 84, an outer edge the upper wall 72 and the spacer member offset 52 are aligned as shown by the dotted line "L" in FIG. 18. This alignment ensures that the clamp portion 12 and base portion 14 are vertically aligned so that when the bonding clamp 10 is secured to a PV module frame 200, the at least one electrical bonding member 30 and the at least one pressure member 40 are in a fixed horizontal relationship with a top surface 202, seen in FIGS. 19 and 20, of the PV module frame 200.

Figure 22:
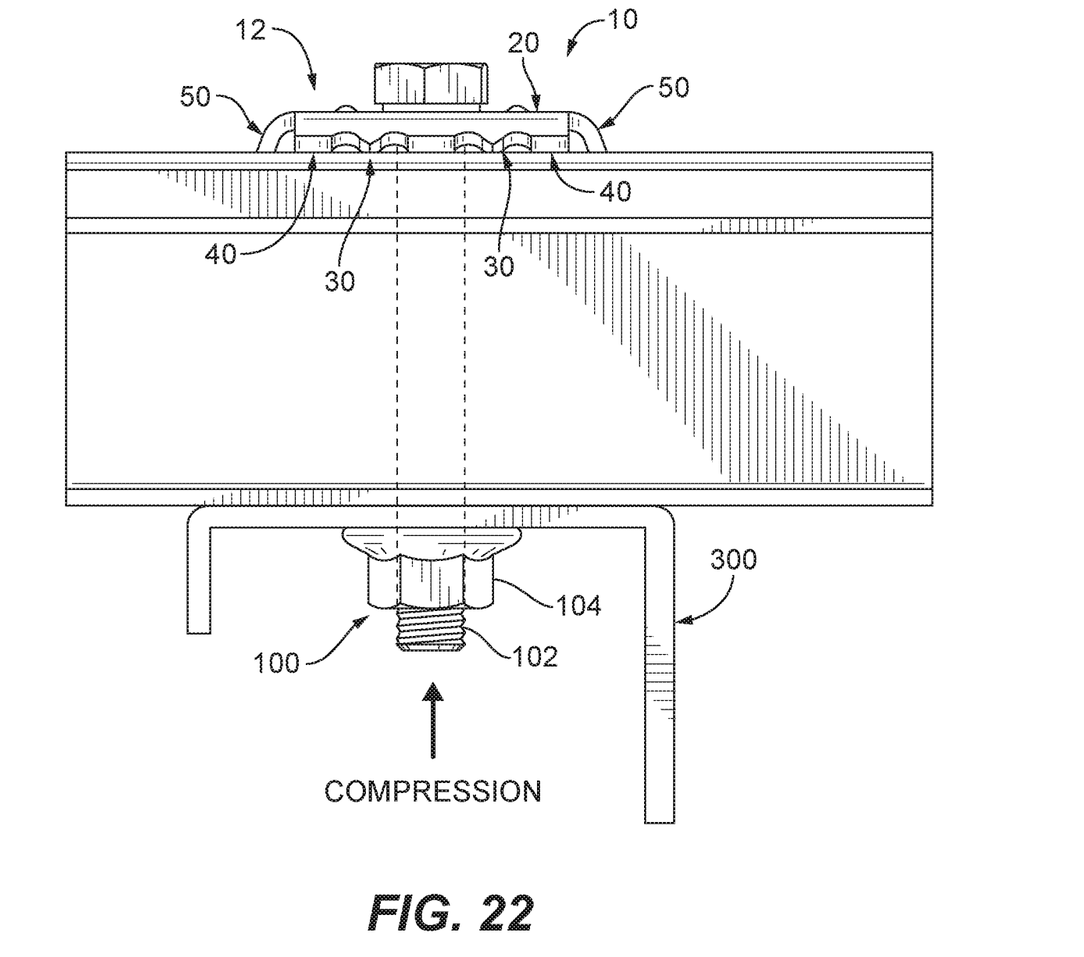
FIG. 22 is a front elevation view of the photovoltaic array of FIG. 19, illustrating the universal bonding end clamp of FIG. 1 connecting and bonding the photovoltaic module frame to the rail using a nut and bolt fastener.

Turning to FIGS. 19-22, securing a PV module frame 200 to a rail 300 using the bonding clamp 10 of the present disclosure will be described. Initially, the clamp portion 12 of the bonding clamp 10 is aligned with the base portion 14 as described above. The clamp portion 12 is then positioned so that the electrical bonding members 30 and pressure members 40 extending from the body 20 can rest on a top surface 202 of PV module frame 200. In the embodiment shown, with the pressure members 40 resting on the top surface 202 of the PV module frame 200, two electrical bonding members 30 are positioned to pierce any non-conductive coating on PV module frame 200, as seen in FIG. 20. However, one skilled in the art would readily recognize that one electrical bonding member 30 may be positioned to pierce any non-conductive coating on the PV module frame 200, or that more than two electrical bonding members 30 can be positioned to pierce any non-conductive coating on the PV module frame 200. One skilled in the art would also recognize that one, two or more than three pressure members 40 may be positioned to engage PV module frame 200 and apply a force or pressure to the PV module frame 200 in the direction of a rail 300 of a rail system so as to secure the PV module frame 200 to the rail 300 of the rail system. The mounting aperture 80 in the lower wall 74 is also aligned with a mounting aperture (not shown) in the rail 300. A mounting fastener 100 (e.g., a nut and bolt, or rivet) can be used to secure the bonding clamp 10 to the PV module frame 200 and rail 300. More specifically, and referring to a nut and bolt fastener member, a bolt 102 is passed through mounting aperture 24 in the clamp portion 12 and through the mounting apertures 78 and 80 in the base portion 14, and through the aperture in the rail 300. A nut 104, seen in FIGS. 21 and 22, is then attached to the bolt 102 and tightened to secure the bonding clamp 10 to the PV module frame 200, and to secure the PV module frame 200 to the rail 300.

When the nut 104 and bolt 102 are tightened, each electrical bonding member 30 positioned over the top surface 202 of the PV module frame 200 cuts through or pierces any non-conductive coating on the top surface 202 so that the conductive metal of the clamp portion 12 is in electrical contact with the conductive metal of the PV module frame 200, as seen in FIG. 20, to create an electrically conductive path between the PV module frame 200 and the bonding clamp 10. As noted above, the mounting fastener 100, here bolt 102 and nut 104, is made of an electrically conductive material so that when the mounting fastener 100 is tightened an electrically conductive path is created between the bonding clamp 10 and the rail 300. As a result, an electrically conductive path is created from the PV module frame 200 through the at least one electrical bonding member 30 to the body 20 of the bonding clamp 10 through the mounting fastener 100 to the rail 300. As described above, in the embodiment where the pressure members 40 are offset from the body 20, when the fastener 100 is tightened the offset of the pressure members 40 exert a downward force that opposes the compression (or clamping) force of the tightened mounting fastener 100 so as to maintain a tight connection between the bonding clamp 10, the PV module frame 200 and the rail 300 of the rail system.

Figure 23:
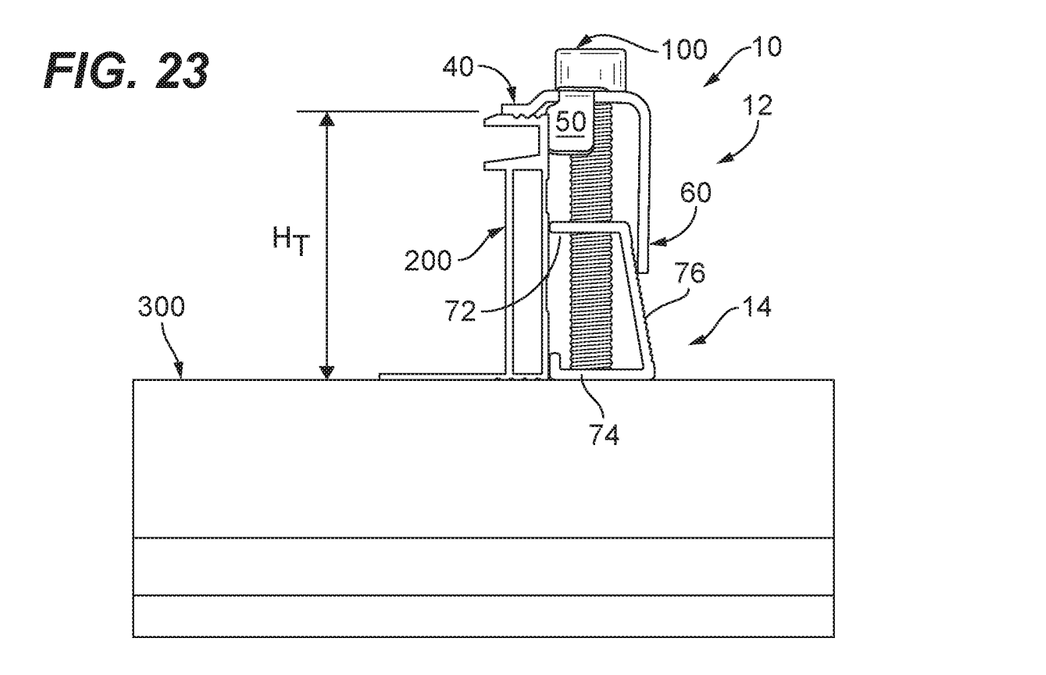
FIG. 23 is a side elevation view of the photovoltaic array of FIG. 19 illustrating the bonding clamp of FIG. 1 connecting and bonding the photovoltaic module frame to the rail.
Figure 24:
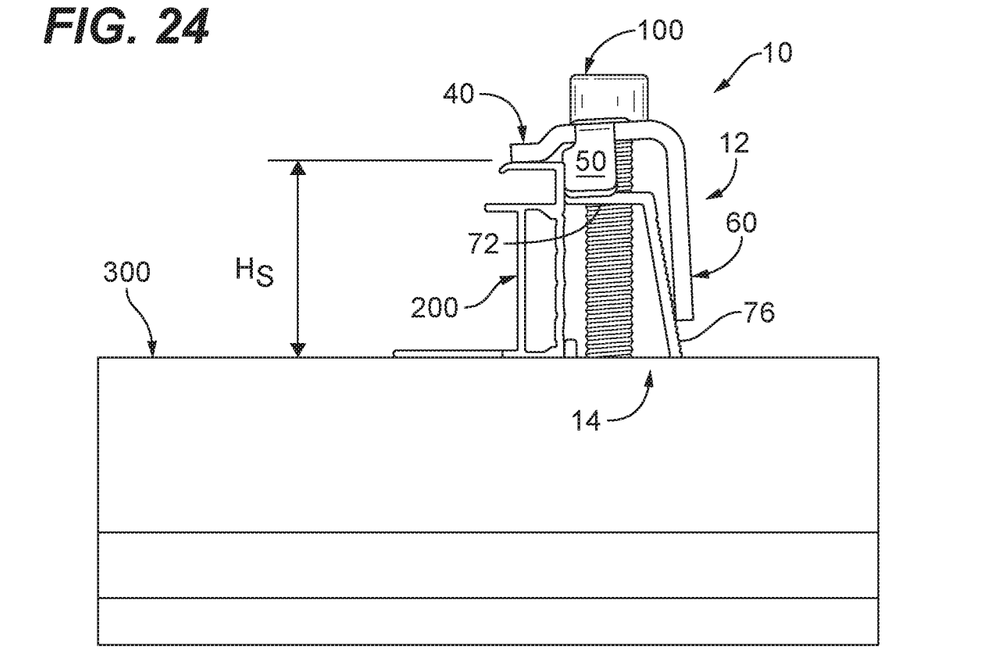
FIG. 24 is a side elevation view of another exemplary embodiment of a photovoltaic array similar to FIG. 19 and illustrating the bonding clamp of FIG. 1 connecting and bonding a photovoltaic module frame having a smaller height than the photovoltaic module frame of FIG. 23 to a rail.

Referring now to FIGS. 23 and 24, as noted above, the bonding clamp 10 of the present disclosure is a universal bonding end clamp used to assembly photovoltaic (PV) arrays having a range of heights. The range of heights is based upon the height of the PV module frame 200 and can be for example in the range from about 25 mm to about 50 mm. As such, the bonding clamp 10 can be used to secure PV module frames 200 forming part of the PV array to a rail 300 of a rail system forming part of the PV array. In the embodiment of FIG. 23, the bonding clamp 10 is securing a PV module frame 200 having a height "$H_T$" to a rail 300. As shown, when securing the PV module frame 200 to a rail 300, the base pressure member 60 engages the side wall 76 of the base portion 14 at a point closer to the upper wall 72. In the embodiment of FIG. 24, the bonding clamp 10 is securing the PV module frame 200 having a height "$H_S$" to a rail 300. The height $H_S$ is smaller than the height $H_T$ such that when securing the PV module frame 200 of FIG. 24 to a rail 300, the base pressure member 60 engages the side wall 76 of the base portion 14 at a point closer to the lower wall 74. As noted the ribs 82 facilitate additional gripping between the base pressure member 60 and the side wall 76.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A bonding clamp comprising:
   a clamp portion comprising:
      a body having a top surface, a bottom surface, and a mounting structure for receiving a mounting fastener;
      at least one electrical bonding member extending from a first side of the body;
      at least one pressure member extending from the first side of the body; and
      a base pressure member extending from a second side of the body, the second side of the body being opposite the first side of the body; and
   a base portion comprising:
      an upper wall having a first mounting structure;
      a lower wall having a second mounting structure, the second mounting structure being aligned with the first mounting structure; and
      a side wall between the upper wall and the lower wall so that the lower wall is spaced from the upper wall, the upper wall is at an angle relative to the side wall and the lower wall is at an angle relative to the side wall;
   wherein when the clamp portion is positioned relative to the base portion for installation, the clamp portion mounting structure is aligned with the first and second mounting structures and the base pressure member engages the side wall of the base portion.

2. The bonding clamp according to claim 1, wherein the side wall of the base portion comprises a plurality of ribs that facilitate enhanced gripping between the base pressure member and the side wall when engaged.

3. The bonding clamp according to claim 1, wherein the clamp portion further comprises at least one spacer member extending from the electrically conductive body in a direction away from the bottom surface of the body.

4. The bonding clamp according to claim 3, wherein at least one spacer member comprises:
   a first spacer member extending from the electrically conductive body in a direction away from the bottom surface of the body; and
   a second spacer member extending from the electrically conductive body in a direction away from the bottom surface of the body.

5. The bonding clamp according to claim 1, wherein the clamp portion mounting structure comprises an aperture, and the first and second mounting structure comprises an aperture.

6. The bonding clamp according to claim 1, wherein the body is substantially planar.

7. The bonding clamp according to claim 1, wherein the body is made of an electrically conductive material.

8. The bonding clamp according to claim 7, wherein the electrically conductive material comprises one of stainless steel, conductive steel, aluminum or aluminum alloy.

9. The bonding clamp according to claim 1, wherein the at least one electrical bonding member is made of an electrically conductive material.

10. The bonding clamp according to claim 9, wherein the electrically conductive material comprises one of stainless steel, conductive steel, aluminum or aluminum alloy.

11. The bonding clamp according to claim 1, wherein the at least one electrical bonding member comprises a single electrical bonding member.

12. The bonding clamp according to claim 1, wherein the at least one electrical bonding member comprises a plurality of electrical bonding members.

13. The bonding clamp according to claim 1, wherein the at least one electrical bonding member includes at least one piercing surface.

14. The bonding clamp according to claim 13, wherein the at least one piercing surface comprises a plurality of piercing surfaces.

15. The bonding clamp according to claim 14, wherein each of the plurality of piercing surfaces comprise a pointed tip.

16. The bonding clamp according to claim 14, wherein each of the plurality of piercing surfaces comprise a serrated tip.

17. The bonding clamp according to claim 13, wherein the at least one piercing surface comprises a single piercing surface.

18. The bonding clamp according to claim 17, wherein the single piercing surface comprise a pointed tip.

19. The bonding clamp according to claim 17, wherein the single piercing surface comprise a serrated tip.

20. The bonding clamp according to claim 1, wherein the at least one pressure member comprises a single pressure member.

21. The bonding clamp according to claim 1, wherein the at least one pressure member comprises a plurality of pressure members.

22. The bonding clamp according to claim 1, wherein the at least one pressure member extending from the body has an offset such that a frame engaging surface of the at least one pressure member lies in a different plane than the bottom surface of the electrically conductive body.

23. A bonding clamp comprising:
   a clamp portion comprising:
      an electrically conductive body having a top surface, a bottom surface, first and second spacer sides, a frame side, a base side and a mounting structure for receiving a mounting fastener, the second spacer side of the body being opposite the first spacer side of the body, and the base side of the body being opposite the frame side of the body;
at least one electrical bonding member extending from the frame side of the electrically conductive body;
at least one pressure member extending from the frame side of the electrically conductive body;
a base pressure member extending from the base side of the electrically conductive body;
a first spacer member extending from the first spacer side of the electrically conductive body; and
a second spacer member extending from the second spacer side of the electrically conductive body; and
a base portion comprising:
an upper wall having a first mounting structure;
a lower wall having a second mounting structure, the second mounting structure being aligned with the first mounting structure; and
a side wall between the upper wall and the lower wall so that the lower wall is spaced from the upper wall, the upper wall is at an angle relative to the side wall and the lower wall is at an angle relative to the side wall;
wherein when the clamp portion is positioned relative to base portion for installation, the clamp portion mounting structure is aligned with the first and second mounting structures and the base pressure member engages the side wall of the base portion.

24. The bonding clamp according to claim 23, wherein the side wall of the base portion comprises a plurality of ribs that facilitate enhanced gripping between the base pressure member and the side wall when engaged.

25. The bonding clamp according to claim 23, wherein the mounting structure comprises an aperture.

26. The bonding clamp according to claim 23, wherein the electrically conductive body is substantially planar.

27. The bonding clamp according to claim 23, wherein the first spacer member extends from the first spacer side and in a direction away from the bottom surface of the body, and the second spacer member extends from the second spacer side and in a direction away from the bottom surface of the electrically conductive body.

28. The bonding clamp according to claim 23, wherein the first spacer member extends from the bottom surface of the electrically conductive body, and the second spacer member extends from the bottom surface of the electrically conductive body.

29. The bonding clamp according to claim 23, wherein the at least one electrical bonding member comprises a single electrical bonding member.

30. The bonding clamp according to claim 23, wherein the at least one electrical bonding member comprises a plurality of electrical bonding members.

31. The bonding clamp according to claim 23, wherein the at least one electrical bonding member includes at least one piercing surface.

32. The bonding clamp according to claim 23, wherein the at least one electrical bonding member comprises a plurality of piercing surfaces.

33. The bonding clamp according to claim 23, wherein the at least one pressure member comprises a single pressure member.

34. The bonding clamp according to claim 23, wherein the at least one pressure member comprises a plurality of pressure members.

35. The bonding clamp according to claim 23, wherein the at least one pressure member extending from the electrically conductive body has an offset such that a frame engaging surface of the at least one pressure member lies in a different plane than the bottom surface of the electrically conductive body.

* * * * *